United States Patent
Schmitt et al.

(10) Patent No.: US 12,472,557 B2
(45) Date of Patent: Nov. 18, 2025

(54) METHOD FOR PRODUCING A CALIBRATED COMBINATION OF PARTS

(71) Applicant: GKN Sinter Metals Engineering GmbH, Radevormwald (DE)

(72) Inventors: Rainer Schmitt, Wachtberg (DE); Sebastian Siebenmorgen, Cologne (DE); Niklas Schüller, Mayschoss (DE); Hasim Tekines, Wachtberg (DE)

(73) Assignee: GKN Sinter Metals Engineering GmbH, Radevormwald (DE)

( * ) Notice: Subject to any disclaimer, the term of this patent is extended or adjusted under 35 U.S.C. 154(b) by 802 days.

(21) Appl. No.: 17/770,939

(22) PCT Filed: Oct. 19, 2020

(86) PCT No.: PCT/EP2020/079323
§ 371 (c)(1),
(2) Date: Apr. 21, 2022

(87) PCT Pub. No.: WO2021/078670
PCT Pub. Date: Apr. 29, 2021

(65) Prior Publication Data
US 2022/0371090 A1 Nov. 24, 2022

(30) Foreign Application Priority Data
Oct. 21, 2019 (DE) ...................... 10 2019 128 350.7

(51) Int. Cl.
*B22F 7/06* (2006.01)
*B22F 3/16* (2006.01)
(Continued)

(52) U.S. Cl.
CPC .............. *B22F 7/062* (2013.01); *B22F 3/164* (2013.01); *B22F 5/106* (2013.01); *B30B 15/022* (2013.01); *B30B 15/026* (2013.01)

(58) Field of Classification Search
CPC .......... B22F 7/062; B22F 3/164; B22F 5/106; B22F 2003/033; B22F 2003/166; B22F 5/10; B30B 15/022; B30B 15/026
See application file for complete search history.

(56) References Cited

U.S. PATENT DOCUMENTS 5,895,119 A * 4/1999 Miyasaka ............. F16C 33/104
384/279
8,303,891 B2  11/2012 Siessl et al.
(Continued)

FOREIGN PATENT DOCUMENTS

CN  200995489 Y  12/2007
CN  101534981 A  9/2009
(Continued)

OTHER PUBLICATIONS

The State Intellectual Property Office of People's Republic of China, First Office Action and Search Report, Application No. 202080073742.0, Apr. 28, 2024, 14 pages.
(Continued)

*Primary Examiner* — Ricardo D Morales
(74) *Attorney, Agent, or Firm* — Quarles & Brady LLP

(57) ABSTRACT

A calibrated combination of parts are produced according to a method. The combination of parts includes at least one first part with a first contact surface and a second part with a second contact surface. The parts contact each other via the contact surfaces in the combination of parts. The parts are designed to be free of an undercut at least with respect to an axial direction and can be moved relative to each other along the axial direction and thereby along the contact surfaces in the calibrated combination of parts. The method has at least the following steps: a) providing the parts in the form of green bodies, b) sintering the parts and at least forming bonded connections between the parts; c) arranging the combination of parts in a calibrating tool; d) moving the
(Continued)

Figure 4:
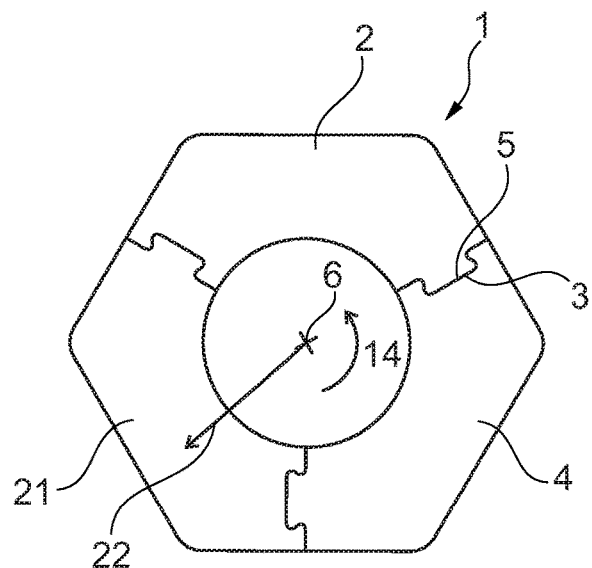

parts relative to each other; e) arranging the parts in order to form the combination of parts; and f) calibrating the combination of parts.

13 Claims, 2 Drawing Sheets

(51) Int. Cl.
*B22F 5/10* (2006.01)
*B30B 15/02* (2006.01)

(56) References Cited

U.S. PATENT DOCUMENTS

| | | |
|---|---|---|
| 9,132,480 B2 | 9/2015 | Cripps |
| 9,956,614 B2 | 5/2018 | Ohler et al. |
| 2012/0214014 A1 | 8/2012 | Schmitt et al. |
| 2013/0038420 A1 | 2/2013 | Uozumi et al. |
| 2013/0266681 A1 | 10/2013 | Cripps |
| 2014/0050551 A1 | 2/2014 | Pineiro et al. |
| 2015/0306668 A1 | 10/2015 | Reisner |
| 2016/0207107 A1* | 7/2016 | Tausend ............ B21K 1/06 |
| 2016/0236301 A1 | 8/2016 | Frey et al. |
| 2019/0232374 A1 | 8/2019 | Maruyama et al. |

FOREIGN PATENT DOCUMENTS

| | | |
|---|---|---|
| CN | 102770222 A | 11/2012 |
| CN | 102792402 A | 11/2012 |
| CN | 203453231 U | 2/2014 |
| CN | 103687684 A | 3/2014 |
| CN | 105705279 A | 6/2016 |
| DE | 102012017040 A1 | 3/2014 |
| GB | 2320032 A | 6/1998 |
| WO | 2011035862 A1 | 3/2011 |

OTHER PUBLICATIONS

PCT International Search Report and Written Opinion and translation thereof, PCT/EP2020/079323 Nov. 27, 2020, 24 pages.

* cited by examiner

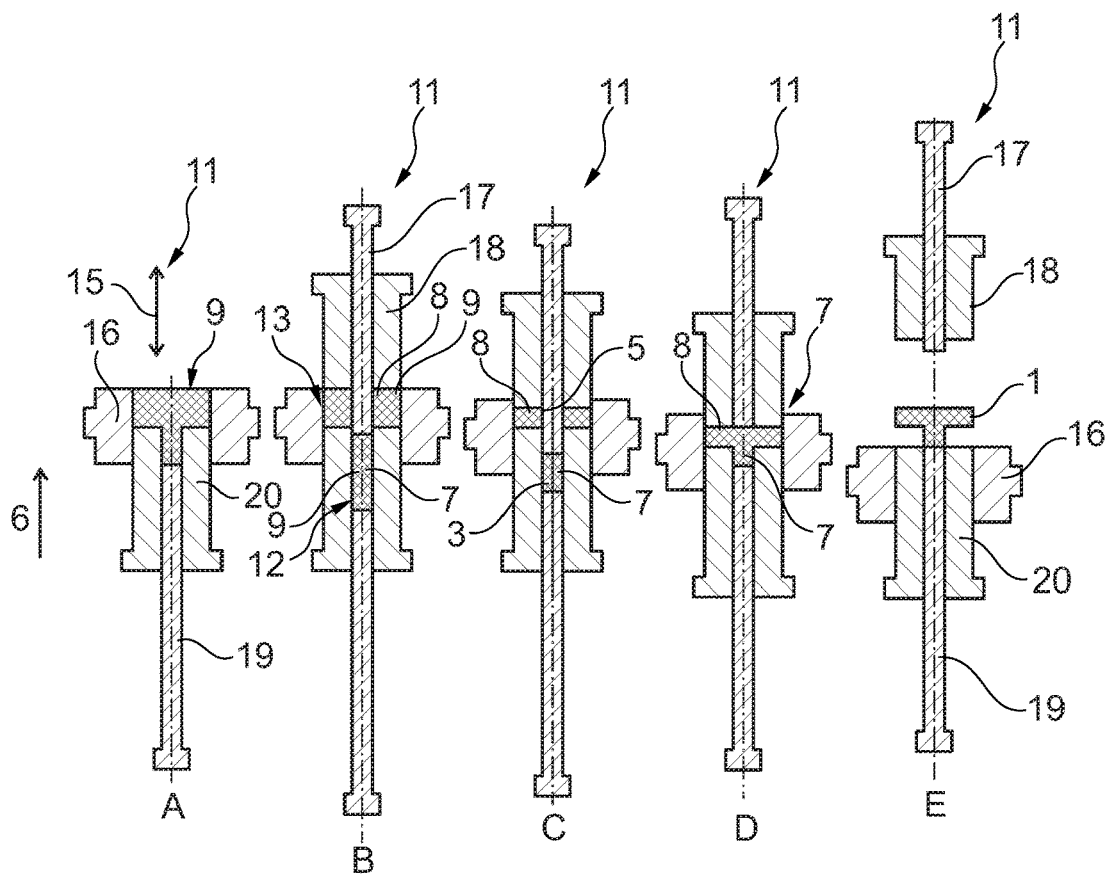
Fig. 1
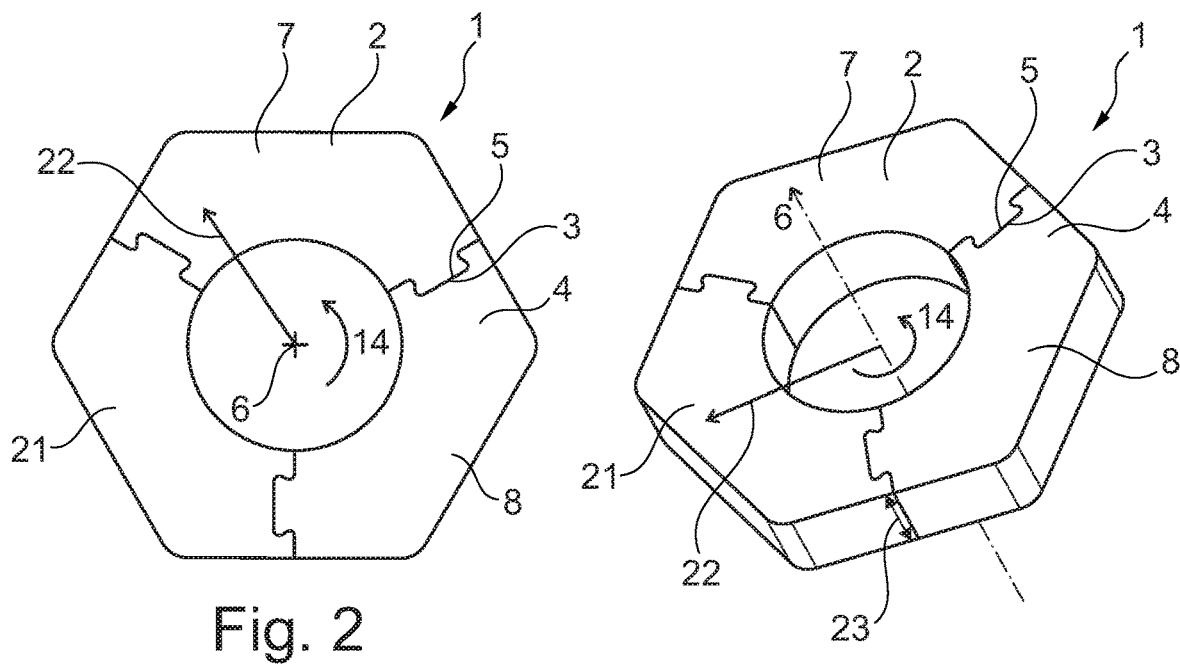
Fig. 2
Fig. 3

METHOD FOR PRODUCING A CALIBRATED COMBINATION OF PARTS

This application represents the U.S. national stage entry of International Application No. PCT/EP2020/079323 filed Oct. 19, 2020, which claims priority to German Patent Application No. 10 2019 128 350.7 filed Oct. 21, 2019, the disclosure of which is incorporated herein by reference in its entirety and for all purposes.

The invention relates to a method for producing a calibrated parts assembly. The parts are produced in particular from a pulverulent material by pressing to form green bodies and subsequently by sintering to form solid workpieces (sintered part). Sintered parts of this kind can be subjected to postprocessing by a subsequent pressing (calibrating) operation in order to obtain a greater level of dimensional accuracy.

A parts assembly frequently comprises a plurality of parts which have to be separated from one another at least intermittently, for example for arrangement on and fastening to other components. By way of example, connecting rods can be produced in the form of a parts assembly, wherein the big end for fastening the connecting rod to a crankshaft should be of two-part embodiment.

To produce a parts assembly, it is for example known to firstly produce the parts assembly from a single-part workpiece and to provide a fracture notch. The single-part workpiece is then fractured (cracked) by way of the fracture notch, with the result that two parts are produced, which can be joined together exclusively with the respectively other part again by way of an individually embodied fracture surface.

During the production of a powder-metallurgically produced parts assembly, it is known to produce each of the parts of the parts assembly individually by pressing, to sinter them individually and to calibrate them individually.

It is an object of the present invention to at least partially solve the problems mentioned in the prior art. In particular, a method for producing a parts assembly is intended to be proposed, the parts being produced from a pulverulent material by pressing and sintering, and optionally by calibration. In this case, the method is intended to achieve a high dimensional accuracy of the parts assembly, wherein the complexity of the method is intended to be as low as possible.

A method having the features of claim 1 contributes to achieving these objects. Advantageous embodiments are the subject of the dependent claims. The features set out individually in the claims may be combined with one another in any technologically meaningful way and may be supplemented by explanatory substantive matter from the description and/or details from the figures, with further embodiment variants of the invention being shown.

A method for producing a calibrated parts assembly is proposed, wherein the parts assembly comprises at least a first part having a first contact surface and a second part having a second contact surface, wherein, in the parts assembly, the parts contact one another via the contact surfaces. The parts are embodied in an undercut-free manner at least in relation to an axial direction and can, in the calibrated parts assembly, be displaced relative to one another along the axial direction and along the contact surfaces. The method comprises at least the following steps:

a) providing the first part and the second part in each case in the form of a green body, wherein a green body is produced from a pulverulent material by pressing;

b) sintering the parts and at least partially forming materially bonded connections between the parts via the contact surfaces;

c) arranging the parts assembly in a calibration tool;

d) displacing the parts relative to one another along the axial direction in the calibration tool;

e) arranging the parts, in order to form the parts assembly, with mutually contacting contact surfaces in the calibration tool, and f) calibrating the parts assembly by pressing and providing the calibrated parts assembly.

The above (non-conclusive) subdivision of the method steps into a) to f) is intended to serve primarily only for distinguishing purposes and not to dictate any sequence and/or dependency. The frequency of the method steps may also vary. Equally, it is possible for method steps to at least partially overlap in respect of time. Very particularly preferably, method step f) takes place during step d) and/or step e). In particular, steps a) to f) are performed in the stated sequence.

The contact surfaces of the parts extend in particular exclusively in planes which run parallel to the axial direction. In the arrangement of the parts assembly, the parts contact one another via the contact surfaces. The parts are embodied such that they can be displaced relative to one another along the axial direction, wherein the parts slide against one another via the contact surfaces. For this purpose, the parts are embodied in an undercut-free manner, that is to say the parts can be displaced relative to one another along the axial direction in an uninhibited manner; there are thus no stops against which the parts can abut.

The parts assembly may comprise two or more parts. The parts are provided in the form of green bodies according to step a). A green body refers to a workpiece which is produced by the pressing of pulverulent starting material.

According to step b), the parts are sintered to one another. For this purpose, the parts are positioned relative to one another, in particular in the arrangement provided by the parts assembly, and jointly sintered. In particular, the sintering involves using a temperature slightly below a melting temperature of the material used, wherein the individual particles of the pulverulent material connect to one another in a materially bonded manner by way of so-called sintering necks.

In the arrangement of the parts in the parts assembly, the parts contact one another via the provided contact surfaces.

According to step c), the sintered parts, which are connected to one another via the contact surfaces, are inserted in the form of a parts assembly into a calibration tool.

A (known) calibration tool is in particular a press or may be incorporated in a press. The parts assembly can be subjected to subsequent forming by means of a calibration tool. The parts of the parts assembly are at least in part further compacted by the calibration tool and plastically deformed.

In step d), the parts are displaced relative to one another along the axial direction, that is to say in particular parallel to the extent of the contact surfaces. The parts are displaced relative to one another by various components of the calibration tool (by one or more lower punches/one or more upper punches). As a result of the displacement, the connections generated in step b) between the contact surfaces of the parts are broken.

In particular, the parts are displaced to such an extent along the axial direction that the mutually contacting contact surfaces still have an overlap of at least 90%, in particular at least 75%, preferably at least 25%, along the axial direction (compared with an overlap of 100% of the contact surfaces in the arrangement provided for the parts assembly).

It is also possible for the parts to be displaced to such an extent along the axial direction that the contact surfaces no longer overlap.

As a result of the breaking of the materially bonded connections, the parts are once again separate from one another and may be moved independently of one another after removal from the calibration tool.

In step e), the parts are displaced (back) again and in particular positioned relative to one another in the arrangement provided by the parts assembly. However, the arrangement of the parts according to step b) and step e) may also differ from one another. In particular, the positions of the parts differ, between step b) and step e), only in terms of a position along the axial direction.

In step f), the parts or the parts assembly are/is calibrated. A subsequent pressing operation is effected here, in particular to increase the dimensional accuracy. In particular, this involves plastically deforming the parts or the parts assembly.

The proposed method permits a high dimensional accuracy of the parts assembly, since, at the end of the method, the parts are calibrated together (that is to say in a state already joined or arranged so as to form the parts assembly) and optionally plastically deformed together.

In particular, the parts of the parts assembly cannot be exchanged with other parts of another parts assembly. The parts of the parts assembly thus remain assigned to one another at all times (i.e. from the pressing of the powder to form the green body up to the calibration).

In particular, prior to step a), in a step a0), in a common operation and in a common pressing tool, the parts are pressed from the pulverulent material to form a first green body and a second green body and are joined to one another in order to form the parts assembly, such that the parts contact one another via the contact surfaces. The parts thus produced are provided in the form of a parts assembly in step a).

In particular, to form the respective green body, the first part is pressed in a first working space of the pressing tool and the second part is pressed in a second working space of the tool. In this case, at least one green body is displaced relative to the respectively other working space (or the green body that has already been generated by pressing), along the axial direction, in order to form the parts assembly.

A (known) pressing tool comprises, in particular, one or more lower punches and one or more upper punches, and also a die and optionally one or more mandrels.

In particular, both parts are already present in the form of green bodies prior to the displacement for forming the parts assembly, that is to say both pulverulent materials in each working space have already been pressed to form the respective green body.

In particular, the pressing of the respective green body may take place at the same time or in parallel in time. It is also possible to allow the pressing of the respective green body to take place mutually offset in time. In particular, the displacement of the green bodies or of the working spaces may likewise be effected at the same time, in parallel in time or offset in time with respect to the pressing of the materials to form the respective green body.

In particular, the working spaces are arranged offset from one another along the axial direction, such that the parts (or working spaces, or pulverulent materials) do not contact one another during the pressing of at least the one part to form a green body.

It is preferable for at least one green body to have already been generated prior to the displacement or prior to the contacting of the two working spaces (or of the pulverulent materials contained therein). In this way, it is possible to essentially prevent mixing of the pulverulent materials. In particular, boundary surfaces (the subsequent contact surfaces), which run parallel to the axial direction, between the green bodies can thus be retained or produced, such that, during the calibration, subsequent separation of the parts along the contact surfaces is made possible or ensured.

In particular, the green bodies are joined to one another in step a0) so as to form a transition fit or even with a press fit. A press fit comprises in particular a slight overlap of the parts along a direction transverse to the axial direction. A transition fit optionally also permits play between the parts along a direction transverse to the axial direction. As a result of the press fit, the parts can be joined to one another, that is to say displaced into the arrangement of the parts that is provided for the parts assembly, only with the application of a pressing force. The fit makes it possible for the parts to be able to be handled and transported together in the form of assembly.

Such a method for producing a parts assembly from green bodies, comprising pressing pulverulent materials to form green bodies, moving the green bodies relative to one another so as to form a press fit and thus generating the parts assembly, is known, for example, from WO 2011/035862 A1.

Said document correspondingly describes that partial green bodies are firstly pressed separately in a (pressing) tool, then brought together and subsequently joined. In this case, the separated partial quantities of the pulverulent substance in the tool are pressed to form two separate partial green bodies and are brought together in the tool in a subsequent working step. Separate pressing may mean that the partial quantities of the pulverulent substance are spaced apart from one another in the tool in such a way that two separate working spaces which are spaced apart from one another are formed in the tool, separate green bodies, which are then referred to as partial green bodies, being produced in said working spaces. In this case, it is likewise possible that, during the pressing of the partial green bodies, the press punches of the adjacent working space form a working space for the respectively other pressed body or partial green body. A press punch arranged in the center of the tool may in this case form a cavity in a first working space for a first partial green body, while the outer press punches for the first partial green body form an outer working space for a second partial green body which is formed by means of the central press punch. This embodiment is not limited to merely separate pressing of the two partial green bodies; rather, it is likewise possible to firstly press a partial green body in a first separate, spaced-apart working space and to transfer this partial green body into the second working space for the second partial green body. Subsequently, during the pressing of the second partial green body, the first partial green body is held in the working space thereof such that joining of the first partial green body with the resultant second partial green body is effected directly. The joining together of the first and second partial green body is thus shifted to a working phase of the tool in which the second partial green body is pressed.

The present method in particular makes use of the high accuracy of fit of the thus produced green bodies of the subsequent calibrated parts assembly. Both during the compaction itself and during the demolding and the subsequent handling, sintered components are at risk of cracking at cross-sectional transitions, inter alia owing to density inhomogeneities and/or owing to axial and radial stresses in the tool. The risk of cracking at the cross-sectional transitions for example owing to stresses in the green body which occur during the pressing process is avoided by the method known from WO 2011/035862 A1, since the at least two partial green bodies are compacted independently of one another, without disruptive influences at cross-sectional transitions, and are subsequently joined in one operation. In particular, a particularly preferred accuracy of fit between the partial green bodies to be joined is achieved. If the green body (that is to say the green bodies forming the parts assembly) is sintered subsequent to the demolding from the pressing tool (and optionally after further processing steps of the green body), the high accuracy of fit of the green bodies with one another results in sintering at the contact surfaces of the green bodies. The accuracy of fit may influence the intensity of the sintering. In the case of a transition fit, a smaller degree of sintering is to be expected than in the case of a press fit.

In particular, after the parts assembly has been formed in step a0), the parts are provided in the form of a parts assembly in step a) and are sintered in the form of a parts assembly in step b).

In particular, the green bodies are thus no longer separate from one another prior to the insertion into the calibration tool. The high accuracy of fit of the parts assembly (in the state of the joined green bodies and in the state of the sintered workpiece) can thus be utilized for the calibration or for the subsequent use of the parts as a parts assembly.

In particular, the first part and the second part are produced from an identical pulverulent material.

Furthermore, a parts assembly is proposed, produced by the described method. The calibrated parts assembly comprises at least a first part having a first contact surface and a second part having a second contact surface, wherein, in the parts assembly, the parts contact one another via the contact surfaces. The parts are embodied in an undercut-free manner at least in relation to an axial direction and can, in the calibrated parts assembly, be displaced relative to one another at least along the axial direction and along the contact surfaces.

In particular, in order to separate or produce the parts assembly, the parts can be moved relative to one another exclusively along the axial direction. In particular, the parts are thus provided with geometrical structures which, in relation to a radial direction and/or a circumferential direction, bring about a form-fitting connection of the parts.

In particular, in order to separate or produce the parts assembly, the parts can additionally be moved relative to one another along the radial direction. In particular, the parts are thus provided with geometrical structures which, in relation to other radial directions and/or a circumferential direction, bring about a form-fitting connection of the parts. In particular, there may be a minimal undercut in relation to the one radial direction, which can be overcome by elastic deformation such that radial joining is made possible.

In particular, the parts assembly is of ring-shaped embodiment, wherein each part forms a ring segment which extends along a circumferential direction.

In particular, the parts are embodied so as to be identical to one another (or alternatively so as to differ from one another) in terms of their geometrical design.

The thus produced parts assembly can be produced with a high dimensional accuracy, wherein the parts, preassembled to form the parts assembly, may be available for further use.

The statements made with respect to the method can in particular be applied to the parts assembly and vice versa in each case.

It is pointed out by way of precaution that the numerical terms used here ("first", "second", . . . ) serve primarily (only) for distinction between several similar objects, dimensions or processes, that is to say in particular do not imperatively specify any dependency and/or sequence of these objects, dimensions or processes in relation to one another. Should a dependency and/or sequence be necessary, this is explicitly stated here, or is obvious to a person skilled in the art when studying the specifically described embodiment. If a component can occur more than once ("at least one"), the description relating to one of these components can similarly apply to all or some of the plurality of these components, but this is not mandatory.

Figure 5:
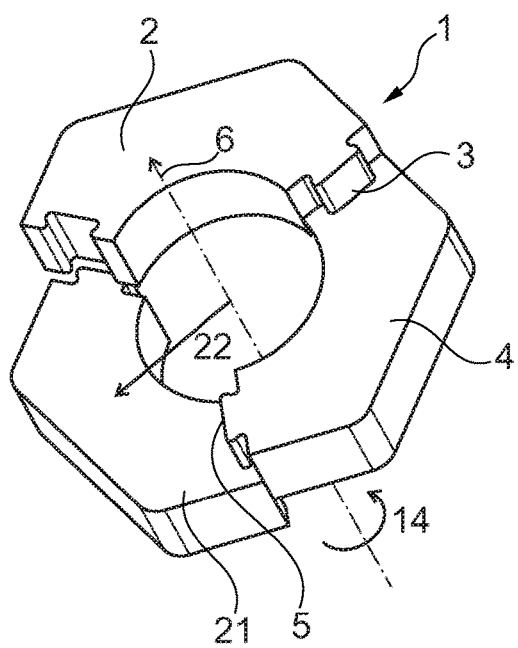
Figure 6:
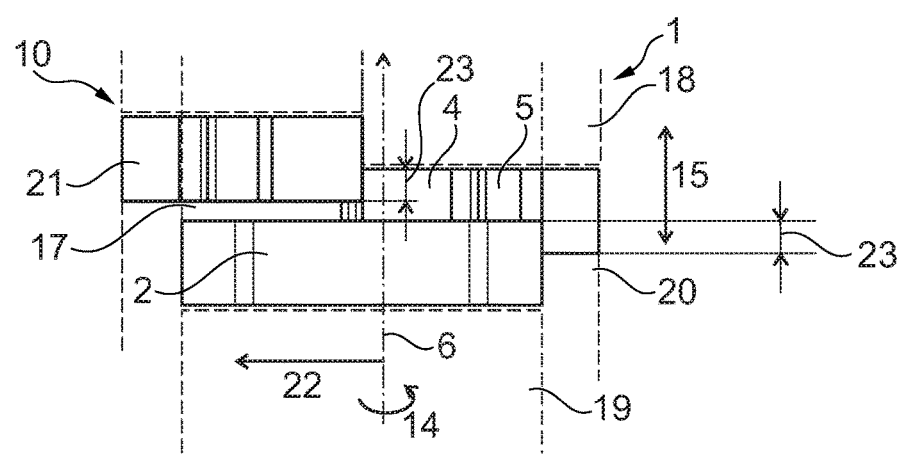

The invention and the technical field will be explained in more detail below on the basis of the appended figures. It is to be noted that the invention is not intended to be limited by the exemplary embodiments mentioned. In particular, unless explicitly stated otherwise, it is also possible to extract partial aspects of the explanatory substantive matter in the figures and to combine these with other parts and findings from the present description. In particular, it is to be noted that the figures and in particular the illustrated size ratios are only schematic. In the figures:

FIG. 1: shows a known method for producing green bodies;

FIG. 2: shows a parts assembly in a view along an axial direction;

FIG. 3: shows a perspective view of the parts assembly according to FIG. 2;

FIG. 4: shows the parts assembly according to FIG. 2;

FIG. 5: shows a perspective view of the parts assembly according to FIGS. 2 to 4 with parts that have been displaced relative to one another along the axial direction; and FIG. 6: shows a side view of the parts assembly according to FIGS. 4 and 5.

FIG. 1 shows a method for producing green bodies 7, 8 that is known from WO 2011/035862 A1. Such a method for producing a parts assembly 1 from green bodies 7, 8 comprises pressing pulverulent materials 9 to form green bodies 7, 8, displacing/moving the green bodies 7, 8 relative to one another so as to form a press fit and thus generating the parts assembly 1.

The pressing tool 11 comprises a die 16, a first upper punch 17, a second upper punch 18, a first lower punch 19 and a second lower punch 20. According to step A of the illustrated method, the lower punches 19, 20 are displaced in the die 16 and the pulverulent material 9 is arranged. In step B, the upper punches 17, 18 are arranged in the die 16 and all punches 17, 18, 19, 20 are displaced relative to one another such that a first working space 12 and a second working space 13, comprising materials 9 that are separated from one another, are formed. In step C, the materials 9 in the working spaces 12, 13 are pressed to form the green bodies 7, 8. In step D, the green bodies 7, 8 are joined to one another by the displacement of the punches 17, 18, 19, 20. In step E, the parts assembly 1 formed by the green bodies 7, 8 is ejected.

The green bodies 7, 8 are thus firstly pressed separately in a pressing tool 11, then brought together and subsequently joined. In this case, the separated partial quantities of the pulverulent material 9 in the pressing tool 11 are pressed to form two separate green bodies 7, 8 and are brought together in the pressing tool 11 in a subsequent working step. During the pressing of the green bodies 7, 8, the punches 17, 19 of the adjacent working space 12 form a working space 13 for the respectively other green body 8. A punch 17, 19 arranged in the center of the pressing tool 11 may in this case form a cavity in a second working space 13 surrounding these punches 17, 19, such that the first green body 7 generated in the first working space 12 may be introduced into this cavity during the joining. The outer punches 18, 20 form the outer second working space 13 for the second green body 8.

FIG. 2 shows a parts assembly 1 in a view along an axial direction 6. FIG. 3 shows a perspective view of the parts assembly 1 according to FIG. 2. FIG. 4 shows the parts assembly 1 according to FIG. 2. FIG. 5 shows a perspective view of the parts assembly 1 according to FIGS. 2 to 4 with parts 2, 4 that have been displaced relative to one another along the axial direction 6. FIG. 6 shows a side view of the parts assembly 1 according to FIGS. 4 and 5. FIGS. 2 to 6 will be described jointly below.

The calibrated parts assembly 1 comprises a first part 2 having a first contact surface 3 and a second part 4 having a second contact surface 5, and also a third part 21, wherein, in the parts assembly 1, the parts 2, 4, 21 contact one another via the contact surfaces 3, 5. The parts 2, 4, 21 are each of identical embodiment. The parts 2, 4, 21 are embodied in an undercut-free manner in relation to an axial direction 6 and can, in the calibrated parts assembly 1, be displaced relative to one another only along the axial direction 6 and along the contact surfaces 3, 5.

The parts 2, 4, 21 are provided with geometrical structures (in the manner of a so-called dovetail connection in this case) which, in relation to a radial direction 22 and a circumferential direction 14, bring about a form-fitting connection of the parts 2, 4, 21. The parts assembly 1 is of ring-shaped embodiment, wherein each part 2, 4, 21 forms a ring segment which extends along the circumferential direction 14.

In the course of the method, in step a0), in a common operation and in a common pressing tool 11, a first green body 7 and a second green body 8 (and also a third green body) are generated from the pulverulent material 9 by pressing (see FIG. 1, steps A, B, C). The three green bodies 7, 8 are joined to one another in order to form the parts assembly 1 (see FIG. 1, step D), such that the green bodies 7, 8 (or parts 2, 4, 21) contact one another via the contact surfaces 3, 5. The thus produced parts 2, 4, 21 are provided in the form of a parts assembly 1 in step a) (see FIG. 1, step E and FIGS. 2 and 3).

According to step a), the parts 2, 4, 21 are provided in each case in the form of a green body 7, 8, wherein a green body 7, 8 is produced from a pulverulent material 9 by pressing. According to step b), the parts 2, 4, 21 are sintered and materially bonded connections are formed between the parts 2, 4, 21 via the contact surfaces 3, 5 (for example FIGS. 2 and 3). According to step c), the parts assembly 1 is arranged in a calibration tool 10. According to step d), the parts 2, 4, 21 are displaced relative to one another along the axial direction 6 in the calibration tool 10 (see FIGS. 4 to 6; calibration tool for example designed as per pressing tool 11 according to FIG. 1; only indicated in FIGS. 4 to 6). According to step e), the parts 2, 4, 21 are arranged, in order to form the parts assembly 1, with mutually contacting contact surfaces 3, 5 in the calibration tool 10 (for example as per FIGS. 2 and 3), and according to step f), the parts assembly 1 is calibrated by pressing and the calibrated parts assembly 1 is provided (for example as per FIGS. 2 and 3).

The contact surfaces 3, 5 of the parts 2, 4, 21 extend exclusively in planes which run parallel to the axial direction 6. The parts 2, 4, 21 are embodied such that they can be displaced relative to one another along the axial direction 6, wherein the parts 2, 4, 21 slide against one another via the contact surfaces 3, 5. For this purpose, the parts 2, 4, 21 are embodied in an undercut-free manner, that is to say the parts 2, 4, 21 can be displaced relative to one another along the axial direction 6 in an uninhibited manner.

In step d), the parts 2, 4, 21 are displaced relative to one another along the axial direction 6. The parts 2, 4, 21 are displaced relative to one another by various components of the calibration tool 10 (for example by one or more lower punches 19, 20/one or more upper punches 17, 18; see for example FIG. 1). As a result of the displacement, the connections generated in step b) between the contact surfaces 3, 5 of the parts 2, 4, 21 are broken. In this case, the parts 2, 4, 21 are displaced to such an extent along the axial direction 6 that the mutually contacting contact surfaces 3, 5 still have an overlap 23 of at least 25% along the axial direction 6 (see FIGS. 4 to 6), compared with an overlap 23 of 100% of the contact surfaces 3, 5 in the arrangement provided for the parts assembly 1 (see FIGS. 2 and 3).

In step e), the parts 2, 4, 21 are displaced (back) again and in particular positioned relative to one another in the arrangement provided by the parts assembly 1. However, the arrangement of the parts 2, 4, 21 according to step b) and step e) may also differ from one another.

In step f), the parts 2, 4, 21 or the parts assembly are/is calibrated. A subsequent pressing operation is effected here, in particular to increase the dimensional accuracy. In particular, this involves plastically deforming the parts 2, 4, 21 or the parts assembly 1.

LIST OF REFERENCE DESIGNATIONS

1 Parts assembly
2 First part
3 First contact surface
4 Second part
5 Second contact surface
6 Axial direction
7 First green body
8 Second green body
9 Material
10 Calibration tool
11 Pressing tool
12 First working space
13 Second working space
14 Circumferential direction
15 Pressing direction
16 Die
17 First upper punch
18 Second upper punch
19 First lower punch
20 Second lower punch
21 Third part
22 Radial direction
23 Overlap

The invention claimed is:

1. A method for producing a calibrated parts assembly, wherein the parts assembly comprises at least a first part having a first contact surface and a second part having a second contact surface, wherein, in the parts assembly, the parts contact one another via the contact surfaces; wherein the parts are embodied in an undercut-free manner at least in relation to an axial direction and, in the calibrated parts assembly, are displaceable relative to one another along the axial direction and along the contact surfaces; wherein the method comprises at least the following steps:

a) providing the first part and the second part in each case in the form of a green body, wherein a green body is produced from a pulverulent material by pressing;

b) sintering the parts and at least forming materially bonded connections between the parts via the contact surfaces;

c) arranging the parts assembly in a calibration tool;

d) displacing the parts relative to one another along the axial direction in the calibration tool;

e) arranging the parts, in order to form the parts assembly, with mutually contacting contact surfaces in the calibration tool, and f) calibrating the parts assembly by pressing and providing the calibrated parts assembly.

2. The method as claimed in claim 1, wherein prior to step a), in a step a0), in a common operation and in a common pressing tool, the parts are pressed from the pulverulent material to form a first green body and a second green body and are joined to one another in order to form the parts assembly, such that the parts contact one another via the contact surfaces; wherein the parts are provided in the form of a parts assembly in step a).

3. The method as claimed in claim 2, wherein, to form the respective green body, the first part is pressed in a first working space of the pressing tool and the second part is pressed in a second working space of the pressing tool; wherein at least one green body is displaced relative to the respectively other working space, along the axial direction, in order to form the parts assembly.

4. The method as claimed in claim 3, wherein both parts are present in the form of green bodies prior to the displacement for forming the parts assembly.

5. The method as claimed in claim 3, wherein the working spaces are arranged offset from one another along the axial direction, such that the parts do not contact one another during the pressing of at least the one part to form a green body.

6. The method as claimed in claim 2, wherein the green bodies are joined to one another in step a0) so as to form a press fit or a transition fit.

7. The method as claimed in claim 2, wherein, after the parts assembly has been formed in step a0), the parts are provided in the form of a parts assembly in step a) and are sintered in the form of a parts assembly in step b).

8. The method as claimed in claim 1, wherein the first part and the second part are produced from an identical pulverulent material.

9. A parts assembly, produced by a method as claimed in claim 1, wherein the calibrated parts assembly comprises at least a first part having a first contact surface and a second part having a second contact surface, wherein, in the parts assembly, the parts contact one another via the contact surfaces; wherein the parts are embodied in an undercut-free manner at least in relation to an axial direction and, in the calibrated parts assembly, are displaceable relative to one another at least along the axial direction and along the contact surfaces.

10. The parts assembly as claimed in claim 9, wherein, in order to produce the parts assembly, the parts are moved relative to one another exclusively along the axial direction.

11. The parts assembly as claimed in claim 9, wherein, in order to separate the parts assembly, the parts are moveable relative to one another exclusively along the axial direction.

12. The parts assembly as claimed in claim 9, wherein the parts assembly is ring-shaped, wherein each part forms a ring segment which extends along a circumferential direction.

13. The parts assembly as claimed in claim 9, wherein the parts are identical to one another in terms of their geometrical design.

* * * * *